US009911198B2

(12) United States Patent
Pham

(10) Patent No.: US 9,911,198 B2
(45) Date of Patent: Mar. 6, 2018

(54) METHOD, SYSTEM AND APPARATUS FOR MATCHING MOVING TARGETS BETWEEN CAMERA VIEWS

(71) Applicant: CANON KABUSHIKI KAISHA, Tokyo (JP)

(72) Inventor: Quang Tuan Pham, North Ryde (AU)

(73) Assignee: Canon Kabushiki Kaisha, Tokyo (JP)

( * ) Notice: Subject to any disclaimer, the term of this patent is extended or adjusted under 35 U.S.C. 154(b) by 110 days.

(21) Appl. No.: 14/972,952

(22) Filed: Dec. 17, 2015

(65) Prior Publication Data

US 2017/0178345 A1    Jun. 22, 2017

(51) Int. Cl.
*G06K 9/00* (2006.01)
*G06T 7/20* (2017.01)
*G06K 9/62* (2006.01)

(52) U.S. Cl.
CPC ........ *G06T 7/2093* (2013.01); *G06K 9/00771* (2013.01); *G06K 9/6212* (2013.01); *G06K 9/6215* (2013.01); *G06T 2207/10016* (2013.01); *G06T 2207/30196* (2013.01); *G06T 2207/30232* (2013.01)

(58) Field of Classification Search
None
See application file for complete search history.

(56) References Cited

U.S. PATENT DOCUMENTS

| | | | |
|---|---|---|---|
| 7,397,931 B2 | 7/2008 | Imagawa et al. | |
| 7,711,146 B2 * | 5/2010 | Tu | G06K 9/00295 348/143 |
| 2006/0066723 A1 * | 3/2006 | Iwase | G08B 13/19608 348/169 |
| 2012/0314079 A1 * | 12/2012 | Li | G06K 9/00295 348/159 |
| 2015/0116487 A1 | 4/2015 | Ptitsyn | |

OTHER PUBLICATIONS

Color based object tracking in multi camera environment, by Ester Koller-meier conference paper 2003.*
Ayazoglu, et al., "Dynamic Subspace-Based Coordinated Multicamera Tracking", In Computer Vision (ICCV), 2011 IEEE International Conference on, pp. 2462-2469. IEEE, 2011.

(Continued)

*Primary Examiner* — Vikkram Bali
(74) *Attorney, Agent, or Firm* — Canon USA, Inc. I.P. Division

(57) ABSTRACT

At least one method of, and at least one apparatus, system and computer readable medium for, matching moving targets between two camera views are discussed herein. The moving targets are tracked over video frames in each of the camera views and motion directions of the targets are recorded. Appearance similarities for cross-camera target pairs over synchronized ones of the video frames are determined. A joint probability model of co-occurred ones of the recorded motion directions for the camera views are determined using a weighted accumulation of the recorded motion directions of the cross-camera target pairs, where accumulation weights used in determining the joint probability model are derived from the determined appearance similarities. The moving targets between the camera views are matched using the joint probability model.

16 Claims, 12 Drawing Sheets

(56) References Cited

OTHER PUBLICATIONS

Jo, et al., "A New Approach to Camera Hand-off without Camera Calibration for the General Scene with Non-planar ground", In Proceedings of the 4th ACM international workshop on Video surveillance and sensor networks, pp. 195-202. ACM, 2006.
Wang, et al., "Correspondence-Free Activity Analysis and Scene Modeling in Multiple Camera Views", Pattern Analysis and Machine Intelligence, IEEE Transactions vol. 32, No. 1, pp. 56-71, Jan. 2010.

* cited by examiner

METHOD, SYSTEM AND APPARATUS FOR MATCHING MOVING TARGETS BETWEEN CAMERA VIEWS

TECHNICAL FIELD

The present invention relates generally to image and video processing and, in particular, matching objects between two camera views for re-identifying the objects. The present invention also relates to a method and apparatus for matching moving targets between camera views, and to a computer program product including a computer readable medium having recorded thereon a computer program for matching moving targets between camera views.

BACKGROUND

Public venues such as shopping centres, parking lots and train stations are increasingly subjected to video surveillance with large-scale networks of video cameras. Application domains of large-scale video surveillance include security, safety, traffic management and business analytics. One example application has a pan, tilt and zoom camera, Camera A, tracking a query object on site. When the query object is about to move out of the physical viewing limit of Camera A, another camera, Camera B, in the same network is assigned responsibility to take over tracking the object. The change in responsibility from Camera A to Camera B is often referred to as a "handoff" process. The handoff process usually happens between cameras with overlapping field of view. In handoff, rapid object matching is performed given images of the objects from the two camera views.

Object matching from different camera viewpoints (or views) is difficult. Different cameras operate on different lighting conditions. Different objects may have similar visual appearance, and the same object (e.g., a person or a subject) can have different pose and posture across viewpoints.

One image processing method performs appearance-based object matching. The appearance-based object matching involves first determining visual features of a query object from a first view, then determining the same type of visual features of a candidate object from a second view. The difference between the visual features is then compared. If the difference is smaller than a threshold, the query object and the candidate object are said to match. Otherwise, the query object and the candidate object do not match.

Since different objects may have similar visual appearance, another image processing method skips appearance-based object matching altogether and opts for location-based object matching. Under the assumption of fully calibrated cameras and people moving on a planar ground, the feet location of each person as seen by a camera may be converted to a unique two dimensional (2D) global coordinate on the ground. If two people from two different cameras have the same feet coordinate on the ground, the two people are said to match. However, for the ground coordinate method to work, all cameras must be calibrated which is a non-trivial task especially for a large camera network that requires fast deployment. The assumption of a planar ground is also not applicable to many outdoor environments, where steps, stairs, and uneven terrain are present.

To avoid the need for camera calibration and planar ground assumption, another image processing method uses a location co-occurrence table to determine corresponding locations across two camera views. Two objects match if the locations of the objects in each view co-occur with high probability in the location co-occurrence table. The location co-occurrence table can be learnt from synchronised videos captured by two cameras with overlapping fields of view. For each camera view, foreground objects are segmented using background subtraction. The foreground masks are then quantised into cells. The location co-occurrence table is built for $N_1$ cells in camera view 1 and $N_2$ cells in camera view 2. The location co-occurrence table is initialised as an $N_1 \times N_2$ array of zero (0) values. For each synchronised frame with foreground objects, a pair of cross-camera foreground cells at location $l_1$ in camera view 1 and location $l_2$ in camera view 2 will contribute one count to the $(l_1, l_2)$ entry of the location co-occurrence table. The accumulation continues over multiple video frames with multiple foreground objects at different locations in the camera views. The corresponding locations across two views get high counts while the non-corresponding locations have negligible counts. The co-occurred location counts can be normalised by the total count over the whole table to serve as a probability of location co-occurrence. The location co-occurrence table can be learnt during live camera operation, reducing the need for camera network calibration. However, the resolution of the lookup locations is limited due to foreground image quantisation. Co-occurred locations also do not enable matching when people walk close to each other in a group or when two people cross path.

Thus, a need exists for an improved method of matching cross-camera moving targets.

SUMMARY

It is an object of the present invention to substantially overcome, or at least ameliorate, one or more disadvantages of existing arrangements.

According to one aspect of the present disclosure, there is provided a method of matching moving targets between two camera views, the method comprising: tracking the moving targets over video frames in each of the camera views and recording motion directions of the targets; determining appearance similarities for cross-camera target pairs over synchronised ones of the video frames; determining a joint probability model of co-occurred ones of the recorded motion directions for the camera views using a weighted accumulation of the recorded motion directions of the cross-camera target pairs, where accumulation weights used in determining the joint probability model are derived from the determined appearance similarities; and matching the moving targets between the camera views using the joint probability model.

According to another aspect of the present disclosure, there is provided a system for matching moving targets between two camera views, the system comprising: a memory for storing data and a computer program; at least one processor coupled to the memory for executing the computer program, the computer program comprising instructions to, and/or the at least one processor operating to: track the moving targets over video frames in each of the camera views and record motion directions of the targets; determine appearance similarities for cross-camera target pairs over synchronised ones of the video frames; determine a joint probability model of co-occurred ones of the recorded motion directions for the camera views using a weighted accumulation of the recorded motion directions of the cross-camera target pairs, where accumulation weights used in determining the joint probability model are derived from the determined appearance similarities; and match the moving targets between the camera views using the joint probability model.

According to another aspect of the present disclosure, there is provided an apparatus for matching moving targets between two camera views, the apparatus comprising: means for tracking the moving targets over video frames in each of the camera views and recording motion directions of the targets; means for determining appearance similarities for cross-camera target pairs over synchronised ones of the video frames; means for determining a joint probability model of co-occurred ones of the recorded motion directions for the camera views using a weighted accumulation of the recorded motion directions of the cross-camera target pairs, where accumulation weights used in determining the joint probability model are derived from the determined appearance similarities; and means for matching the moving targets between the camera views using the joint probability model.

According to still another aspect of the present disclosure, there is provided a non-transitory computer readable medium having a computer program stored on the medium for matching moving targets between two camera views (and/or for causing a processor or computer to execute one or more of the methods discussed herein), the program comprising: code for tracking the moving targets over video frames in each of the camera views and recording motion directions of the targets; code for determining appearance similarities for cross-camera target pairs over synchronised ones of the video frames; code for determining a joint probability model of co-occurred ones of the recorded motion directions for the camera views using a weighted accumulation of the recorded motion directions of the cross-camera target pairs, where accumulation weights used in determining the joint probability model are derived from the determined appearance similarities; and code for matching the moving targets between the camera views using the joint probability model.

According to still another aspect of the present disclosure, there is provided a method of matching moving targets between two camera views, the method comprising: tracking the moving targets over video frames in each of the camera views and recording apparent speeds of the targets, determining an apparent speed ratio image for each of the camera views from recorded tracked locations and the recorded apparent speeds, and matching the targets across camera views using the determined apparent speed ratio images.

According to still another aspect of the present disclosure, there is provided a system for matching moving targets between two camera views, the method comprising: a memory for storing data and a computer program; at least one processor coupled to the memory for executing the computer program, the computer program comprising instructions to and/or the at least one processor operating to: track the moving targets over video frames in each of the camera views and record apparent speeds of the targets, determine an apparent speed ratio image for each of the camera views from recorded tracked locations and the recorded apparent speeds, and match the targets across camera views using the determined apparent speed ratio images.

According to still another aspect of the present disclosure, there is provided an apparatus for matching moving targets between two camera views, the apparatus comprising: means for tracking the moving targets over video frames in each of the camera views and recording apparent speeds of the targets, means for determining an apparent speed ratio image for each of the camera views from recorded tracked locations and the recorded apparent speeds, and means for matching the targets across camera views using the determined apparent speed ratio images.

According to still another aspect of the present disclosure, there is provided a non-transitory computer readable medium having a computer program stored on the medium for matching moving targets between two camera views (and/or for causing a processor or computer to execute one or more of the methods discussed herein), the program comprising: code for tracking the moving targets over video frames in each of the camera views and recording apparent speeds of the targets, code for determining an apparent speed ratio image for each of the camera views from recorded tracked locations and the recorded apparent speeds, and code for matching the targets across camera views using the determined apparent speed ratio images.

Other aspects of the invention are also disclosed.

BRIEF DESCRIPTION OF THE DRAWINGS

One or more embodiments of the invention will now be described with reference to the following drawings, in which.

DETAILED DESCRIPTION INCLUDING BEST MODE

Figure 1A:
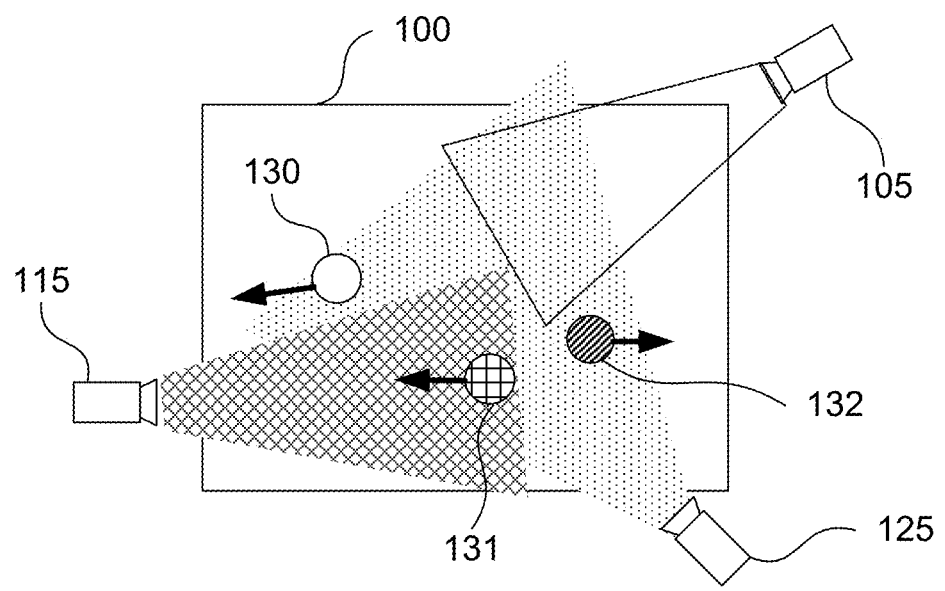
FIGS. 1A and 1B are schematic diagrams of a surveillance network monitoring an area.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and the section above relating to prior art arrangements relate to discussions of documents or devices which may form public knowledge through their respective publication and/or use. Such discussions should not be interpreted as a representation by the present inventors or the patent applicant that such documents or devices in any way form part of the common general knowledge in the art.

As well as appearance and location, object dynamics may also be used for cross-camera target matching. For example, each person has a unique walking pattern or gait that can be used for re-identification. The term "walking period" refers to the time it takes for a person to complete a full walk cycle. Further, "walking phase" refers to the instantaneous position at which the pedestrian is currently at in the walk cycle. Assuming cameras capture synchronised frames at the same rate, the walking period and phase can be used for target matching.

Further, none of the above-mentioned prior art methods make use of temporal information encoded in a camera view pair. Information such as co-occurred motion direction and speed ratio between two locations captured by different cameras is independent of any moving target but can provide useful information for target handoff.

A system, apparatus and methods for matching moving targets captured by two cameras with overlapping fields of view (FOV), according to various arrangements, are described below.

FIG. 1A shows a top-down view of an example use case to which the arrangements described in the present disclosure may be applied. In the example of FIG. 1A, a street area 100 is monitored by a network of digital cameras 105, 115 and 125. The field of view (FOV) of camera 125 encapsulates three moving targets 130, 131 and 132. Each moving target is represented in FIG. 1A by a circle with an arrow to denote his/her motion direction. The FOV of camera 115 overlaps with the FOV of camera 125. Both cameras 115 and 125 capture a common target 131, albeit at different viewing angles. The FOV of camera 105 overlaps with FOV of camera 125, but cameras 105 and 115 have no overlapping FOV. Depending on the FOV arrangement, some cameras such as cameras 115 and 125 capture moving targets, while some other cameras such as 105 capture none. The described arrangements match moving targets across cameras such as target 131 across cameras 115 and 125.

Figure 1B:
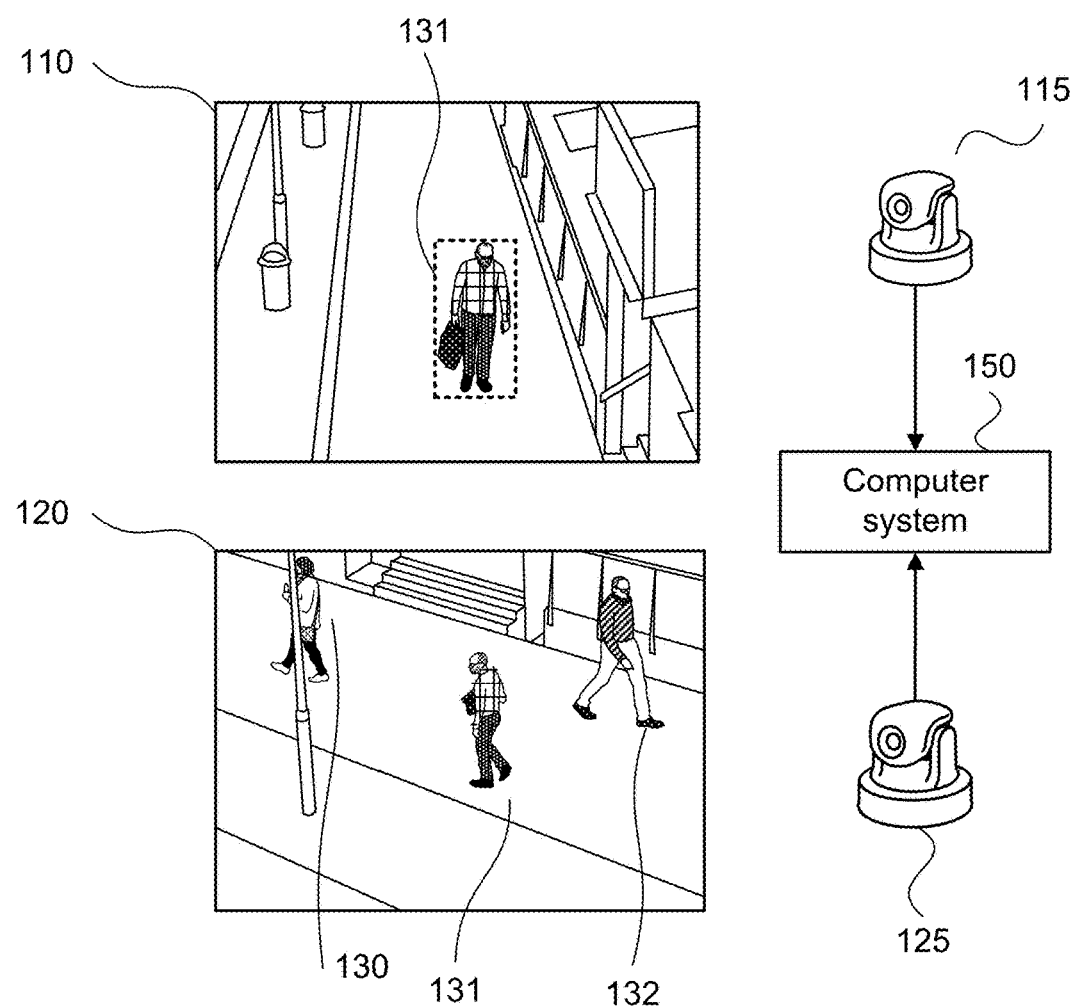

The FOV (or 'camera view') 110 and 120 of cameras 115 and 125, respectively, are further shown in FIG. 1B. The two cameras 115 and 125 capture the scene 100 at different viewpoints. Due to variations in shadows, brightness, contrast, white balance, blur and other photometric properties, common target 131 drawn with a caro shirt may not appear exactly the same across the camera views 110 and 120. However, the appearance of the target 131 in camera view 120 is still sufficiently different from the appearance of targets 130 and 132 for re-identification purposes.

Camera view 120 also shows a potential issue with target 130, which is partially occluded by a light pole. Occlusion such as shown in FIG. 1B can complicate appearance-based target matching across cameras.

A digitised camera view such as camera view 110 is made up of visual elements. The terms "pixel", "pixel location" and "image location" are used interchangeably throughout this specification to refer to one of the visual elements in a captured image. Each pixel of an image is described by one or more values characterising a property of the scene captured in the image. In one example, a single intensity value characterises the brightness of the scene at the pixel location. In another example, a triplet of values characterise the colour of the scene at the pixel location. Furthermore, a "region", "image region" or "cell" in an image refers to a collection of one or more spatially adjacent visual elements.

Figure 2A:
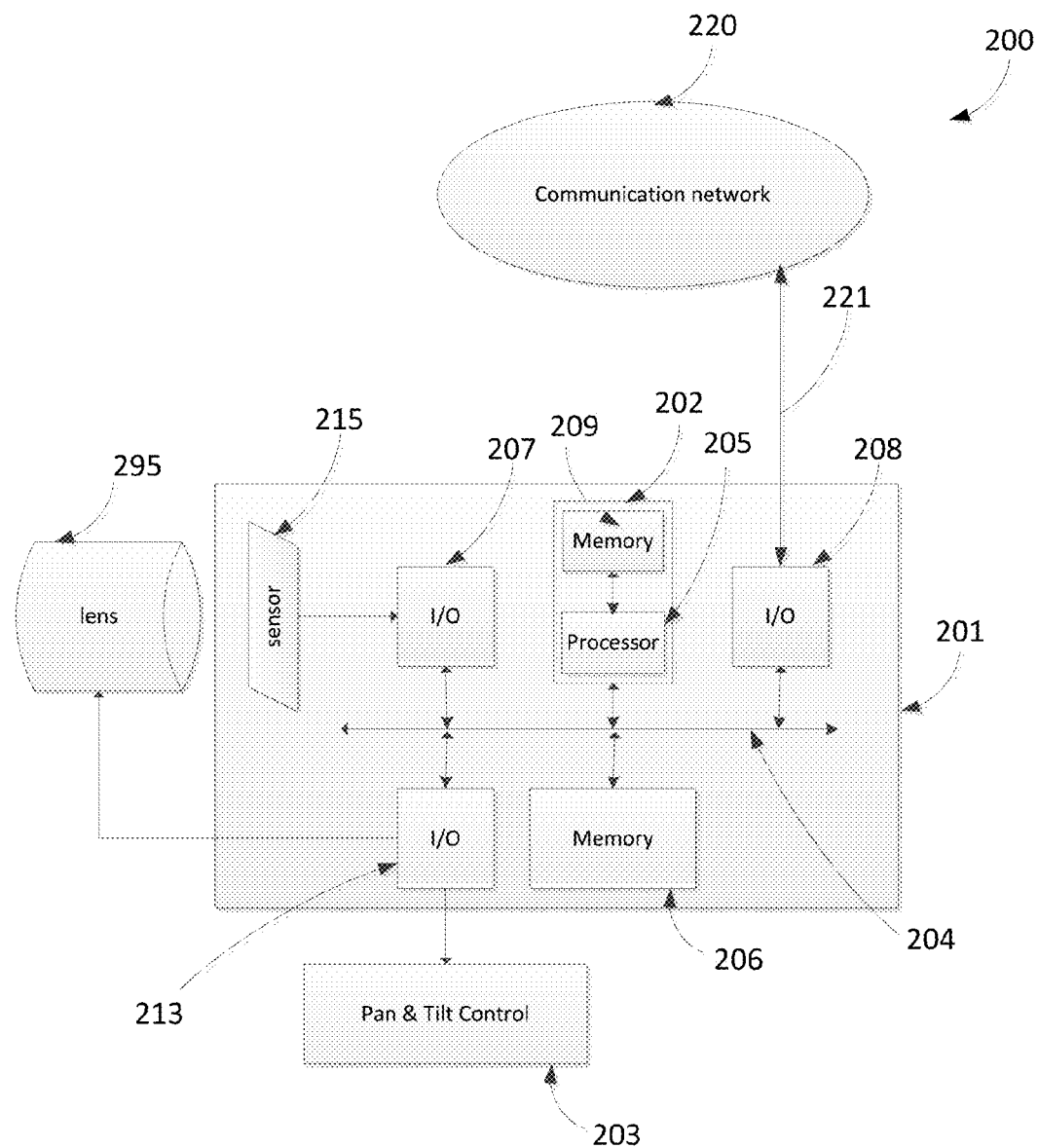
FIGS. 2A and 2B form a schematic block diagram of a camera, upon which described methods may be practiced.
Figure 2B:
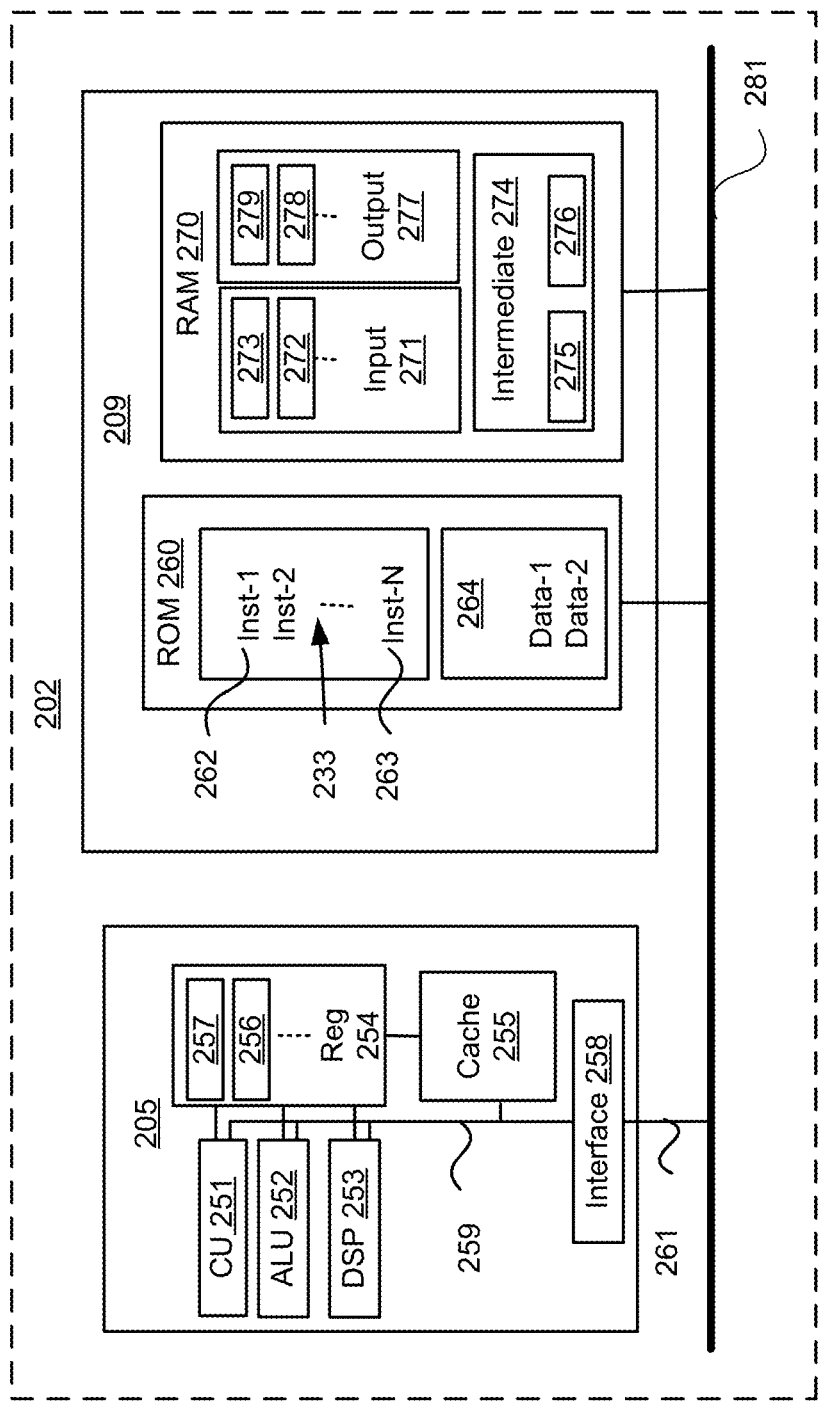

As shown in FIG. 1B, the digital cameras 115 and 125 communicate with a computer system 150 as shown in more detail in FIGS. 2A and 2B. The arrangement of FIG. 1B can be applied to a range of applications. In one example, the computer system 150 allows a security guard to select an object of interest through an interactive user interface, and returns images of one or more candidate objects determined to be the object of interest. In another example, the computer system 200 may be configured to automatically select an object of interest and match the object across multiple distributed cameras in order to analyse the long-term behaviour of the object.

While the examples in the following description mostly relate to surveillance tasks of monitoring persons, the methods described in the present disclosure may equally be practised on other types of objects. In one example, the described methods may be applied to capture the number plate on cars and persistently track a suspicious car. The methods described in the present disclosure may also be implemented using different types of sensors including conventional image or video cameras, infra-red cameras, radar, and acoustic sensors. In one example, the described methods may be used to control the orientation and zoom of a pan-tilt-zoom (PTZ) camera to obtain close-up images of objects and human targets.

Alternatively, the described methods may be implemented using a high resolution static camera (e.g., 40 M pixels). In an implementation using a high resolution static camera, instead of control of a PTZ camera, the described methods may be used to select a local image region of the full-size image for further processing.

As described above, the described methods enable an object of interest to be matched across camera views despite variations in shadows, brightness, contrast, white balance, blur and other photometric properties. Using co-occurrence of motion directions across camera views, objects are matched if the motion directions of the objects are compatible. When combined with traditional appearance-based matching, motion direction congruency provides an extra constraint for improved matching accuracy. A co-occurred motion direction table is a property of the two camera views and is independent of the individual moving objects. The co-occurred motion direction table, however, is determined from many moving objects over multiple synchronised frames. The accuracy of cross-camera object matching can be further improved using epipolar geometry and motion ratio constraint which will be described in detail below.

FIGS. 2A and 2B are a schematic block diagram of a camera 200, upon which the described methods may be practiced. The camera 200 is a pan-tilt-zoom camera (PTZ) and may be used to implement any one of the cameras 105, 115 and 125. The camera 200 comprises a camera module 201, a pan and tilt module 203, and a lens system 295.

As seen in FIG. 2A, the camera module 201 comprises an embedded controller 202. In the example of FIG. 2A, the embedded controller 202 includes at least one processor unit 205 (or processor) which is bi-directionally coupled to an internal storage module 209. The storage module 209 may be formed from non-volatile semiconductor read only memory (ROM) 260 and semiconductor random access memory (RAM) 270, as seen in FIG. 2B. The RAM 270 may be volatile, non-volatile or a combination of volatile and non-volatile memory.

As seen in FIG. 2A, the camera module 201 also comprises a portable memory interface 206 which is coupled to the processor 205. The portable memory interface 206 allows a complementary portable memory device to be coupled to the camera module 201 to act as a source or destination of data or to supplement the internal storage module 209. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The camera module 201 also comprises an input/output (I/O) interface 207 that couples to a photo-sensitive sensor array 215.

The camera module 201 also comprises a communications input/output (I/O) interface 208 that couples to a communications network 220 via a connection 221. The connection 221 may be wired or wireless. For example, the connection 221 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like.

The camera module 201 also comprises an I/O interface 213 for the pan and tilt module 203 and the lens system 295.

The components, which include the sensor I/O interface 207, embedded controller 202, communications I/O interface 208, control interface 213 and memory 206 of the camera module 201, typically communicate via an interconnected bus 204 and in a manner which results in a conventional mode of operation known to those in the relevant art.

The described methods may be implemented using the embedded controller 202, where the processes of FIGS. 3 to 10 may be implemented as one or more software application programs 233 executable within the embedded controller 202. The camera module 201 of FIG. 2A implements the described methods. In particular, with reference to FIG. 2B, the steps of the described methods are effected by instructions in the software 233 that are carried out within the controller 202. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 233 of the embedded controller 202 is typically stored in the non-volatile ROM 260 of the internal storage module 209. The software 233 stored in the ROM 260 can be updated when required from a computer readable medium. The software 233 can be loaded into and executed by the processor 205. In some instances, the processor 205 may execute software instructions that are located in RAM 270. Software instructions may be loaded into the RAM 270 by the processor 205 initiating a copy of one or more code modules from ROM 260 into RAM 270. Alternatively, the software instructions of one or more code modules may be pre-installed in a non-volatile region of RAM 270 by a manufacturer. After one or more code modules have been located in RAM 270, the processor 205 may execute software instructions of the one or more code modules.

The application program 233 is typically pre-installed and stored in the ROM 260 by a manufacturer, prior to distribution of the camera module 201. However, in some instances, the application programs 233 may be supplied to the user encoded on one or more CD-ROM (not shown) and read via the portable memory interface 206 of FIG. 2A prior to storage in the internal storage module 209 or in the portable memory as described above. In another alternative, the software application program 233 may be read by the processor 205 from the network 220, or loaded into the controller 202 or such portable storage medium from other computer readable media. Computer readable storage media refers to any non-transitory tangible storage medium that participates in providing instructions and/or data to the controller 202 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the camera module 201. Examples of transitory or non-tangible computer readable transmission media that may also participate in the provision of software, application programs, instructions and/or data to the camera module 201 include radio or infra-red transmission channels as well as a network connection to another computer or networked device, and the Internet or Intranets including e-mail transmissions and information recorded on Websites and the like. A computer readable medium having such software or computer program recorded on it is a computer program product.

FIG. 2B illustrates in detail the embedded controller 202 having the processor 205 for executing the application programs 233 and the internal storage 209. The internal storage 209 comprises read only memory (ROM) 260 and random access memory (RAM) 270. The processor 205 is able to execute the application programs 233 stored in one or both of the connected memories 260 and 270. When the camera module 201 is initially powered up, a system program resident in the ROM 260 is executed. The application program 233 permanently stored in the ROM 260 is sometimes referred to as "firmware". Execution of the firmware by the processor 205 may fulfil various functions, including processor management, memory management, device management, storage management and user interface.

The processor 205 typically includes a number of functional modules including a control unit (CU) 251, an arithmetic logic unit (ALU) 252, a digital signal processing (DSP) unit 253 and a local or internal memory comprising a set of registers 254 which typically contain atomic data elements 256, 257, along with internal buffer or cache memory 255. One or more internal buses 259 interconnect these functional modules. The processor 205 typically also has one or more interfaces 258 for communicating with external devices via system bus 281, using a connection 261.

The application program 233 includes a sequence of instructions 262 through 263 that may include conditional branch and loop instructions. The program 233 may also include data, which is used in execution of the program 233. This data may be stored as part of the instruction or in a separate location 264 within the ROM 260 or RAM 270.

In general, the processor 205 is given a set of instructions, which are executed therein. The set of instructions may be organised into blocks, which perform specific tasks or handle specific events that occur in the camera module 201. Typically, the application program 233 waits for events and subsequently executes the block of code associated with that event. Events may be triggered in response to input from the interfaces 207, 208 and 213 of the camera module 201.

The execution of a set of the instructions may require numeric variables to be read and modified. Such numeric variables are stored in the RAM 270. The described methods use input variables 271 that are stored in known locations 272, 273 in the memory 270. The input variables 271 are processed to produce output variables 277 that are stored in known locations 278, 279 in the memory 270. Intermediate variables 274 may be stored in additional memory locations in locations 275, 276 of the memory 270. Alternatively, some intermediate variables may only exist in the registers 254 of the processor 205.

The execution of a sequence of instructions is achieved in the processor 205 by repeated application of a fetch-execute cycle. The control unit 251 of the processor 205 maintains a register called the program counter, which contains the address in ROM 260 or RAM 270 of the next instruction to be executed. At the start of the fetch execute cycle, the contents of the memory address indexed by the program counter is loaded into the control unit 251. The instruction thus loaded controls the subsequent operation of the processor 205, causing for example, data to be loaded from ROM memory 260 into processor registers 254, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the application program 233, and is performed by repeated execution of a fetch-execute cycle in the processor 205 or similar programmatic operation of other independent processor blocks in the camera module 201. The camera 200 may be used to capture input images representing the visual content of a scene appearing in the field of view of the camera 200. The visual content may include one or more foreground objects and one or more background objects.

The camera 200 is used to capture video frames representing visual content of a scene appearing in the field of view of the camera 200. Each video frame is an image captured by the camera 200. The described methods may be configured for extracting foreground objects and matching objects across frames from different cameras. The foreground objects may also be referred to as "targets" or "query objects". Although the camera 200 is described as a PTZ camera, the described methods may be implemented as a computer program executing on any type of camera including for example static field-of-view cameras, PTZ cameras, wearable cameras and handheld cameras.

Figure 3:
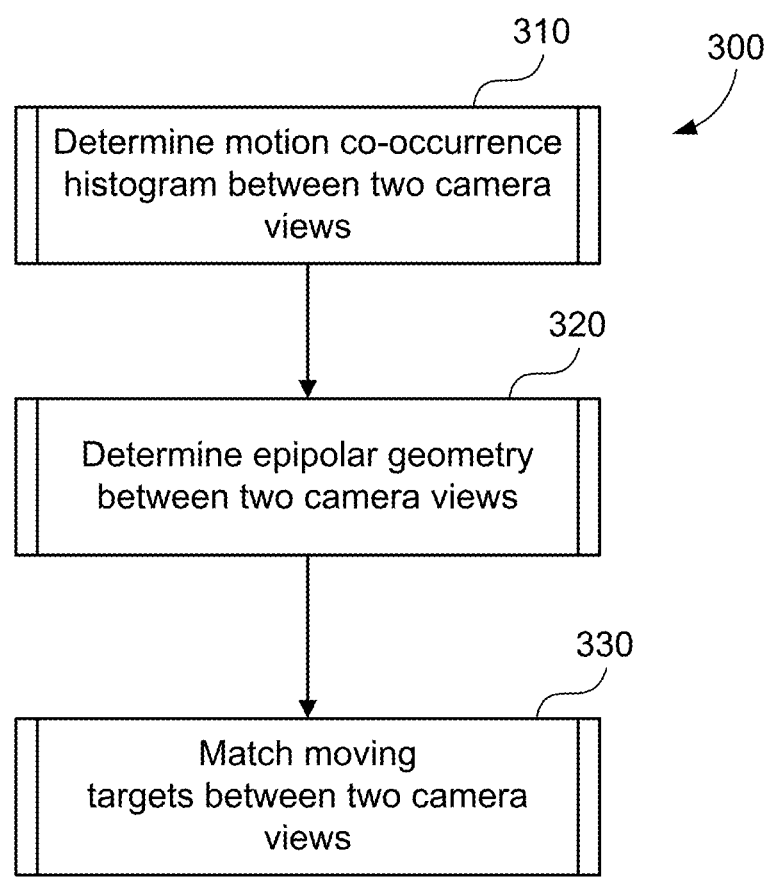
FIG. 3 is a schematic flow diagram showing a method of matching moving targets between two camera views of the camera of FIGS. 2A and 2B.

FIG. 3 is a schematic flow diagram showing a method 300 of performing object matching between two video frames. The method 300 will be described by way of example, where each of the frames represents a different view of the camera 200. The method 300 may be used for matching moving targets between the different camera views of the camera 200. As described in detail below, the targets may be matched using a determined epipolar geometry constraint between two camera views. The epipolar geometry constraint may be determined from locations of the matched targets across the camera views. The moving targets may be matched in accordance with the method using headshots of peopled with two object parts representing a head and shoulder of a person. Alternatively, the moving targets may be matched using images of full human bodies, each comprising three parts representing a head, torso and legs.

As described here, the term "frame" refers to a portion of a video image captured by the camera 200 where boundaries of the image portion define a "tight crop" around an object of interest (OOI) within the image captured by the camera 200.

To be considered a tight crop, the object of interest occupies more than 30% of the frame. For example, FIG. 5B shows an example frame 595 which represents a tight crop of an object of interest 590 including a person's head 596 and shoulder 597. The frame may be referred to as a headshot 595. The headshot 595 contains a region of non-interest such as background 598. As described below, the frame 595 may be received at step 420 (see FIG. 4) from the storage module 209.

The method 300 may be implemented as one or more code modules of the software application program 233 resident in the storage module 209 of the camera 200 and being controlled in its execution by the processor 205.

The method 300 begins at histogram determining step 310, where a motion co-occurrence histogram between the two camera views is determined under execution of the processor 205. The motion co-occurrence histogram may be a two-dimensional histogram. The motion co-occurrence histogram determined at step 310 forms a joint probability model. A method 400 of determining a joint probability model in the form of a motion co-occurrence histogram, as executed at step 310 of the method 300, will be described in detail below with reference to FIG. 4.

Next, the epipolar geometry is determined between the two camera views at epipolar geometry determining step 320, under execution of the processor 205. A method 700 of determining an epipolar geometry model, as executed at step 320, will be described in detail below with reference to FIG. 7.

Steps 310 and 320 are training stages of the method 300. Once the training stages are completed, the moving targets between the two camera views are matched at matching step 330 using the motion co-occurrence histogram determined at step 310 and the epipolar geometry model determined at step 320. A method 800 of matching moving targets between two camera views, as executed at step 330, will be described in detail below with reference to FIG. 8.

A motion co-occurrence histogram forms a joint probability model of co-occurred motion directions between two camera views. The motion co-occurrence histogram is represented by a two-dimensional (2D) array C, where each entry C ($\phi_1$, $\phi_2$) is indexed by a motion direction $\phi_1$ in the first camera view and a motion direction $\phi_2$ in the second camera view. A high value of C ($\phi_1$, $\phi_2$) means that motion direction $\phi_1$ in the first camera view and motion direction $\phi_2$ in the second camera view frequently co-occur. In other words, if an object moves in the direction of $\phi_1$ in the first camera view, a matching counterpart object in the second camera view is likely to move in the direction $\phi_2$.

Ideally, motion directions between two overlapping camera views have a one-to-one correspondence, where knowing the motion direction in one view is the motion direction in the other view to be inferred. However, in practice, due to camera distortion and motion measurement noise, knowing the motion direction $\phi_1$ in camera view 1 only leads to a probability distribution of the likelihood of the motion direction $\phi_2$ being in camera view 2. Although knowledge of the likelihood of the motion direction $\phi_2$ in camera view 2 is weaker than a one-to-one correspondence, the probability distribution typically peaks around the correct corresponding motion direction $\phi_2$. As a result, the motion co-occurrence histogram can produce a compatibility measure C ($\phi_1$, $\phi_2$) between motion directions $\phi_1$ in camera view 1 and motion directions $\phi_2$ is in camera view 2.

At step 310, a joint probability model of co-occurred ones of the recorded motion directions for the camera views, in the form of the motion co-occurrence histogram, is determined. As described below, the motion co-occurrence histogram is determined using a weighted accumulation of recorded motion directions of cross-camera target pairs, where accumulation weights used in determining the joint probability are derived from determined appearance similarities. The appearance similarities may be determined from a set of part-based appearance distances between corresponding object parts.

The 2D histogram is only one method of representing a joint probability model. Given a limited number of co-occurred motion direction pairs (e.g., due to a small number of straight pathways in a scene), the 2D motion co-occurrence histogram can look like a collection of spiky peaks. In such cases, the motion co-occurrence histogram may be represented as a mixture of Gaussian models, where each Gaussian model models a peak and a width of the peak.

Figure 4:
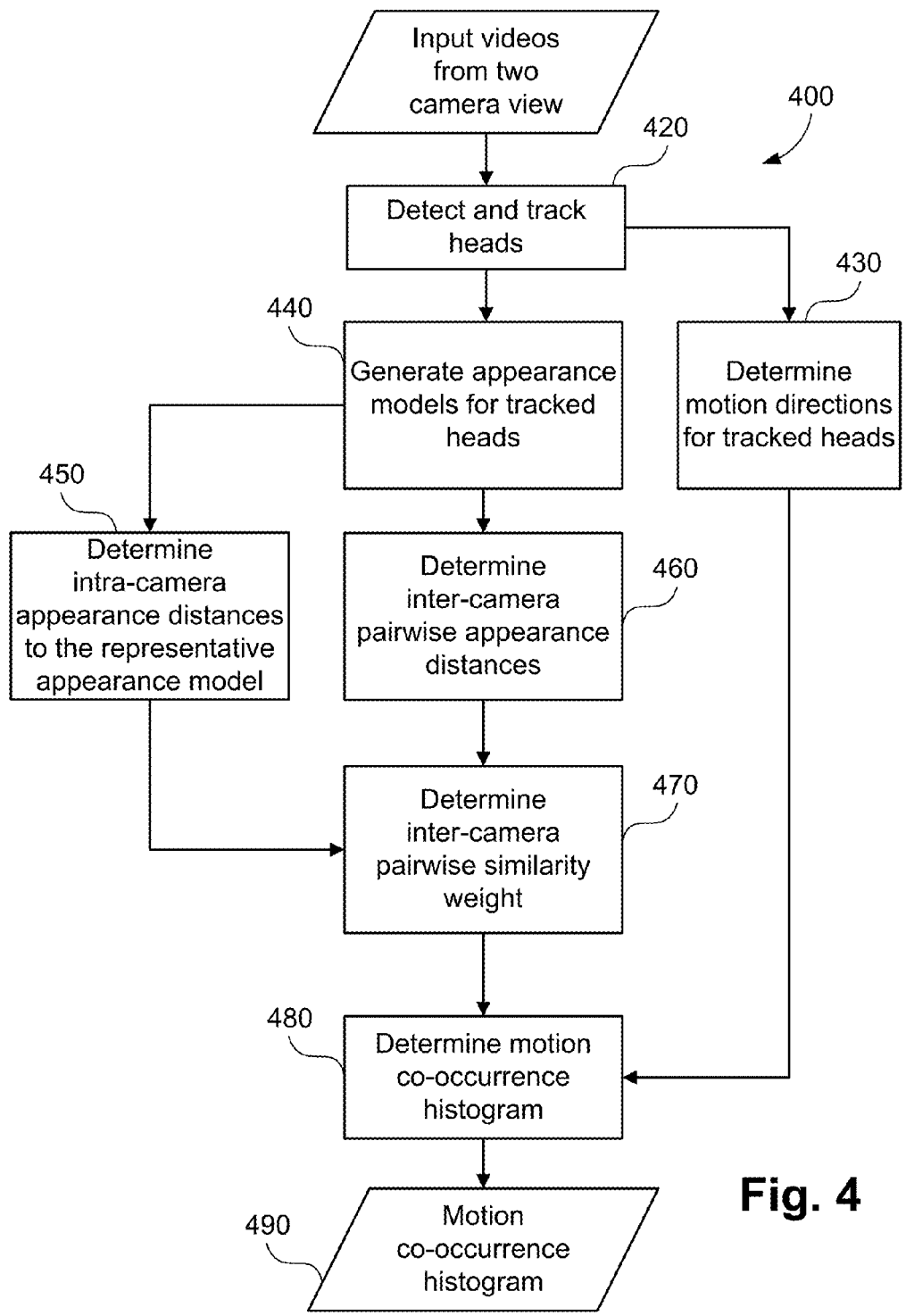
FIG. 4 is a schematic flow diagram showing a method of determining a motion co-occurrence histogram, as executed in the method of FIG. 3.

FIG. 4 is a schematic flow diagram illustrating a method 400 of determining a joint probability model in the form of a motion co-occurrence histogram, as executed at step 310 of the method 300. The joint probability model represents co-occurred motion directions for the camera views of the camera 200, where each camera view corresponds to one of the two video frames on which the object matching is being performed.

The method 400 may be implemented as one or more code modules of the software application program 233 resident in the storage module 209 of the camera 200 and being controlled in its execution by the processor 205.

Figure 6:
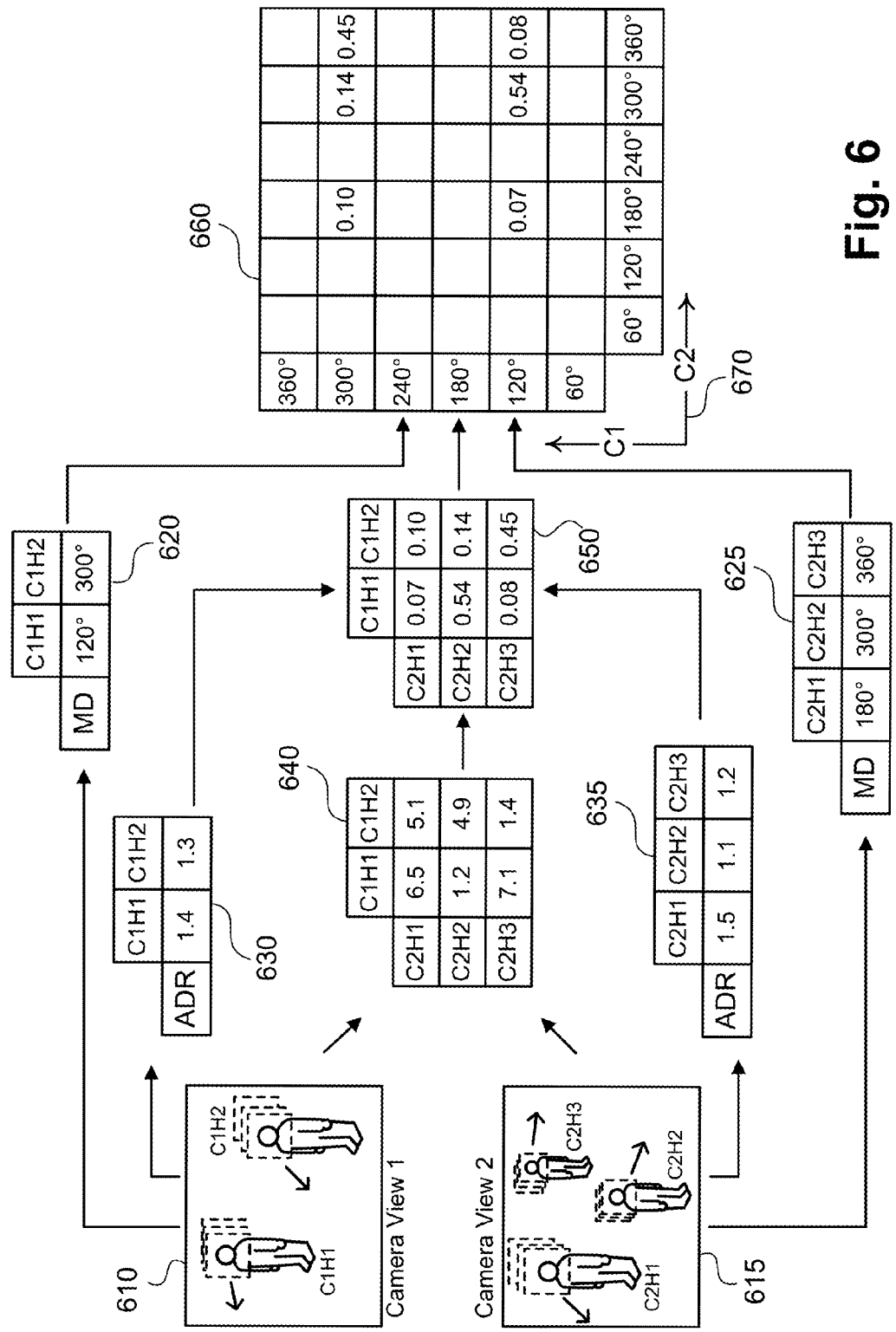
FIG. 6 is a schematic diagram illustrating the process of determining a motion co-occurrence histogram.

The method 400 begins at tracking step 420, where the input videos from the two camera views 410 are received. For example, FIG. 6 shows input videos 610 and 615 from two camera views, Camera View 1 and Camera View 2, respectively. The received input videos may be stored in the memory 209 under execution of the processor 205. The input videos comprise multiple image frames. Each image frame is processed at step 420, under execution of the processor 205, to detect human head objects and track the human head objects between the image frames in each of the camera views. Each human head object may correspond to a moving target so that the moving targets are tracked over the video frames.

Figure 5A:
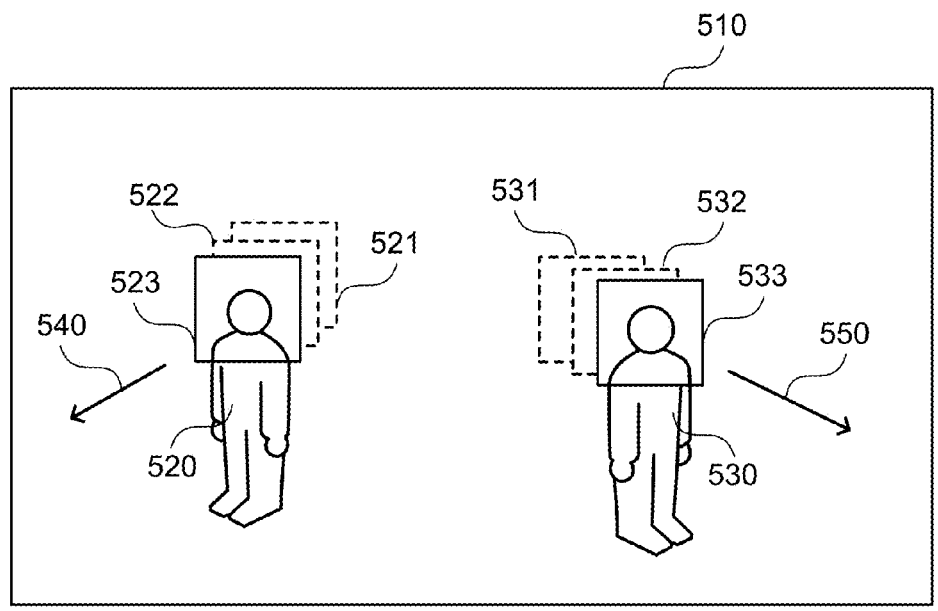
FIG. 5A shows an example input video showing two persons being detected and tracked using the method of FIG. 4.
Figure 5B:
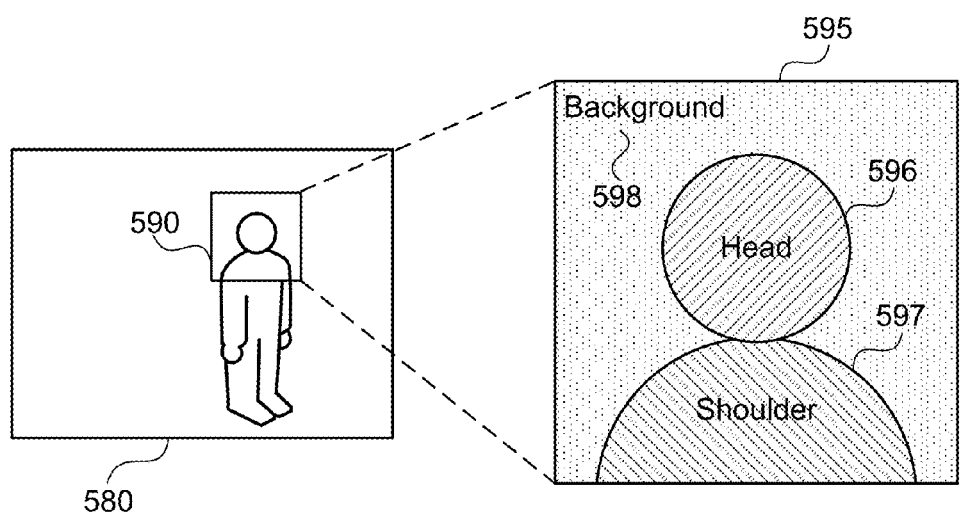
FIG. 5B shows a part-based appearance model of a cropped human head image (or 'headshot')

FIG. 5A shows an input video 510 showing two persons 520, 530 being detected and tracked as at step 420 of the method. The bounding boxes 521, 522, 523 represent the detected head locations of the person 520 in three consecutive frames (i.e., frame n, frame n+1 and frame n+2). Similarly, the bounding boxes 531, 532, 533 are the detected head locations of the person 530 in the same three frames (i.e., frame n, frame n+1 and frame n+2). For each image frame, the output of step 420 is a bounding box location for each detected head object along with an identifier (ID) for each detected head object. The head ID is used to identify the head object across subsequent frames.

The head bounding boxes determined at step 420 are used in motion directions determining step 430 to determine the motion direction for each tracked head object. The motion direction for a tracked head object can be determined by fitting a line through the centroids of the tracked head location bounding boxes over consecutive frames. The motion directions produced at each frame may be averaged over several frames to reduce noise in the detected head locations. The motion directions may be averaged across a +/−π discontinuity. In the example of FIG. 5A, the determined motion directions for persons 520 and 530 are shown by the arrows 540 and 550. Recording the motion directions for each tracked head object may also be performed at step 420, under execution of the processor 205, by storing the determined motion directions in the memory 209.

At generating step 440, an appearance model is generated, under execution of the processor 205, for each detected head object in each image frame. As described in detail below, the appearance models are used for determining similarities for cross-camera target pairs over synchronised ones of the image frames. A method 900 of generating an appearance model of a human head object from an image of the human head object, as executed in step 440, will be described in detail below with reference to FIG. 9.

FIG. 5B shows an example part-based appearance model 595 created for a detected head region 590 in image frame 580. The part-based appearance model can be a colour histogram or a mixture of Gaussian colour models. Step 440 is repeated for each image frame generating a collection of appearance models for every human head object being tracked in an input video. A single collection contains an appearance model for each image frame in which the tracked head object was detected.

For each tracked head object, at least one representative appearance model is selected from the collection of appearance models and the appearance distances from the selected representative model to each appearance model in the collection is determined at distance determining step 450. The appearance distances are called 'intra-camera appearance' distances because the tracked head is captured by the same camera. The representative appearance model is selected based on maximum similarities of its appearance model with the other appearance models in the collection. The selected representative appearance model represents a frequently appeared upper body pose and/or head orientation of a single tracked head object. If the tracked head object significantly changes its appearance multiple times during tracking (e.g. due to change of person walking direction or accessories like a hat), multiple representative appearance models, each corresponding to a representative frame, can be determined.

At distance determining step 460, inter-camera pairwise appearance distances are determined between all pairs of cross-camera appearance models (i.e. between an appearance model of a human head in one camera and an appearance model of a human head in another camera in a corresponding image frame of the two input videos.

Note that intra-camera appearance distances determined at step 450 are determined for a tracked head object using the collections of appearance models associated with that head object, within a single camera view. The appearance distances determined at step 460 are determined in a pair-wise fashion between tracked human head objects across two camera views. The appearance distance is a measure of dissimilarity between two instances of tracked head objects. The lower the appearance distance, the higher the similarity is between the two instances.

Using Gaussian colour appearance model in the YCbCr colour space, the appearance distances between corresponding parts of two different segmented objects can be determined using the Fréchet distance. The Fréchet distance between two Gaussian distributions $X \in N(\mu_x, \Sigma_x)$ and $Y \in N(\mu_y, \Sigma_y)$ with mean colours $\mu_x$, $\mu_y$ and diagonal covariance matrices $\Sigma_x$, $\Sigma_y$ is also the Fröbenius distance determined in accordance with Equation (1), below:

$$D_F(x, y) = \sum_{i=Y, Cb, Cr} (\mu_x^i - \mu_y^i)^2 + (\sigma_x^i - \sigma_y^i)^2 \qquad (1)$$

For headshot images with two object parts (i.e., head and shoulder), the matching score between two segmented head images is measured as the product of the Fréchet distance between the shoulder colours and the square root of the Fréchet distance between the head colours, in accordance with Equation (2), as follows:

$$D_A(\text{object}_1, \text{object}_2) = D_F(\text{shoulder}_1, \text{shoulder}_2) \times \sqrt{D_F(\text{head}_1, \text{head}_2)}. \quad (2)$$

The head appearance distance in Equation (2) is treated with a lower power than the shoulder appearance distance because head appearance is less consistent (i.e., head appearance can appear as either face or hair depending on the direction of the head with respect to the camera) and less discriminative (i.e., similar skin or hair colour for same ethnicity).

For each frame, the intra-camera appearance distances to the representative models determined at step 450 and the inter-camera pairwise appearance distances determined at step 460 are combined to produce an inter-camera pairwise similarity weight at weight determining step 470. The inter-camera pairwise similarity weight determined at step 470 may be stored in the memory 409, under execution of the processor 205.

The similarity weight for a given pair of head objects may be determined by using the inverse of the product of the intra-camera appearance distances for each object to the representative frames and inter-camera pairwise appearance distance of the pair for the objects, in accordance with Equation (3), as follows:

$$\text{weight}(\text{obj}_1, \text{obj}_2) = 1 / [D_A(\text{obj}_1, \text{obj}_2) \times \max(D_A(\text{obj}_1, \text{rep}_1), \epsilon) \times \max(D_A(\text{obj}_2, \text{rep}_2), \epsilon) + \epsilon]. \quad (3)$$

The similarity weight is proportional to the appearance similarity of the two head objects in a given pair as well as similarities of the objects against the representative model within the object track for each object (i.e., collection of appearance models). A small $\epsilon$ value, e.g., $\epsilon=1$, puts a cap on the contribution of the intra-camera distances to the weight in Equation (3). An offset value $\epsilon=1$ at the denominator in equation (3) also ensures the similarity weight is between 0 and 1. The comparison with the intra-camera representative model is to increase the inter-camera similarity weight for image frames similar to the representative frame (i.e., inlier frames) and reduce the inter-camera similarity weight for image frames dissimilar to the representative frame (i.e., potentially outlier frames).

Finally, the motion co-occurrence histogram for the two camera views is determined at histogram determining step 480 by accumulating the inter-camera pairwise similarity weights over all image frames. The motion directions associated with the head objects of each pair are used to index the motion co-occurrence histogram during the accumulation process.

The determined motion co-occurrence histogram 490 may be stored in the memory 209 under execution of the processor 205.

The method 400 of determining a motion co-occurrence histogram will now be further described by way of example with reference to FIG. 6.

FIG. 6 shows the input videos 610 and 615 from two camera views (i.e., Camera view 1 and Camera view 2) as input at step 410. Human head objects in the input videos input at 410 as executed at step 420. Two human head objects (C1H1 and C1H2) as seen in FIG. 6 are tracked in the input video from camera view 1 (C1) and three human head objects (C2H1, C2H2 and C2H3) are tracked in the input video from camera view 2 (C2).

The motion directions (MD) determined at step 430 are listed in tables 620 and 625. The table 620 contains the motion directions for the tracked head objects C1H1 and C1H2. The table 625 contains the motion directions for the tracked head objects C2H1, C2H2 and C2H3.

The intra-camera appearance distances to the representative appearance models (ADR) determined at step 450 are listed in tables 630 and 635. The table 630 contains the appearance distances from the current appearance model to the representative appearance models of the tracked head objects C1H1 and C2H2. The table 635 contains the appearance distances from the current appearance models to the representative appearance models of the tracked head objects C2H1, C2H2 and C2H3.

The appearance models of the tracked head objects in the current corresponding frame across the two camera views C1 and C2 are then used to determine the inter-camera pairwise appearance distance table 640 as described in relation to step 460.

The inter-camera pairwise appearance distance table 640 and the intra-camera appearance distances tables 630, 635 are combined to create the inter-camera pairwise similarity weights table 650 for the current frame as described in relation to step 470 and Equation (3).

The motion co-occurrence histogram 660 is determined by accumulating the inter-camera pairwise similarity weights 650. The motion directions 620 produced for the tracked head objects in C1 are used as the vertical bin indices and the motion directions 625 produced for the tracked head objects in C2 are used as the horizontal bin indices when accumulating the weights in the example of FIG. 6, as indicated by arrows 670. Due to the accumulation over multiple frames of overlapping views with multiple co-appeared moving targets, the frequently co-occurred motion directions have higher counts in the motion co-occurrence histogram. A normalised motion co-occurrence histogram can then be used as a likelihood map for cross-camera motion congruency.

Figure 7:
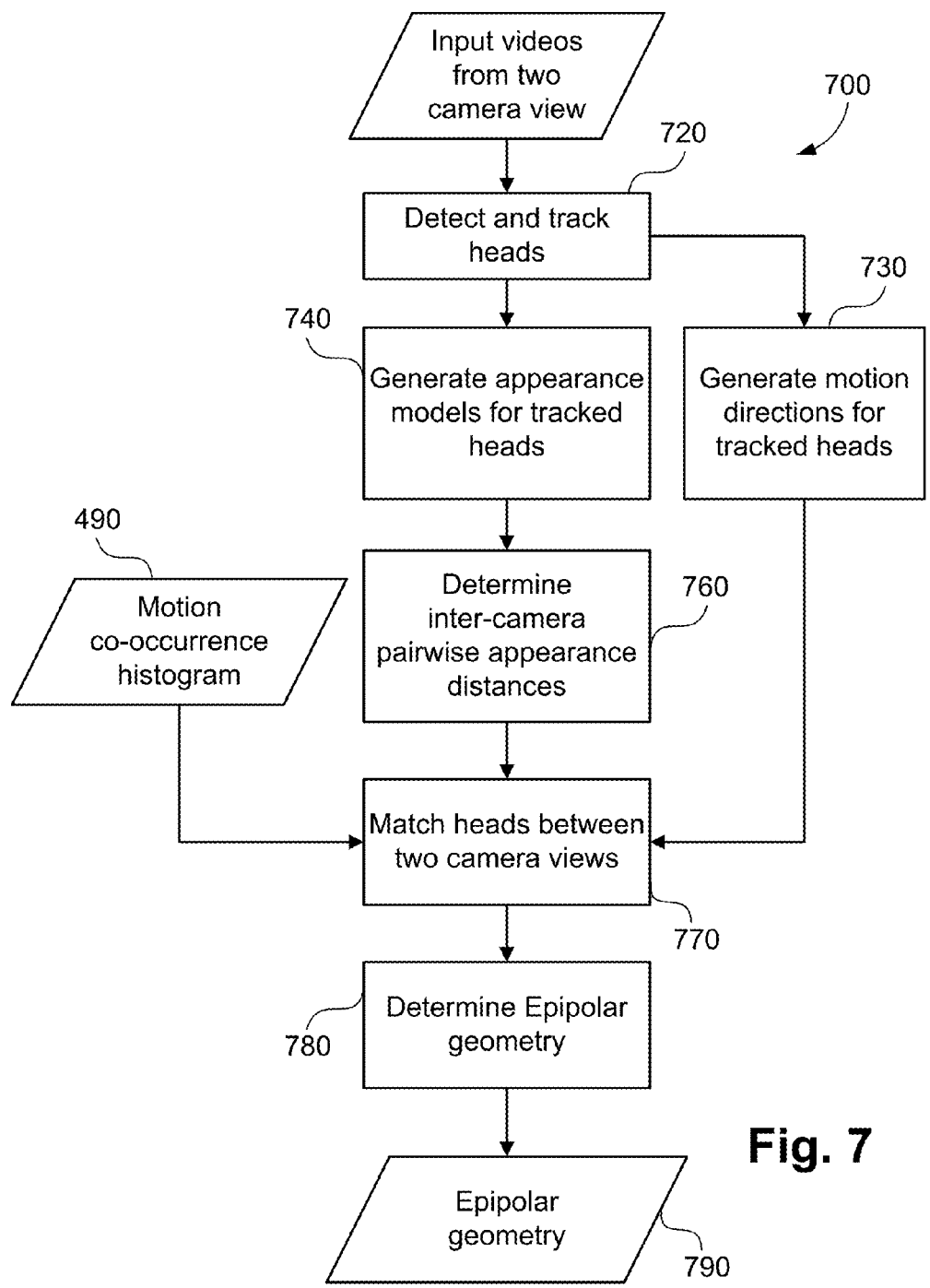
FIG. 7 is a schematic flow diagram showing a method of determining an epipolar geometry model, as executed in the method of FIG. 3.
Figure 8:
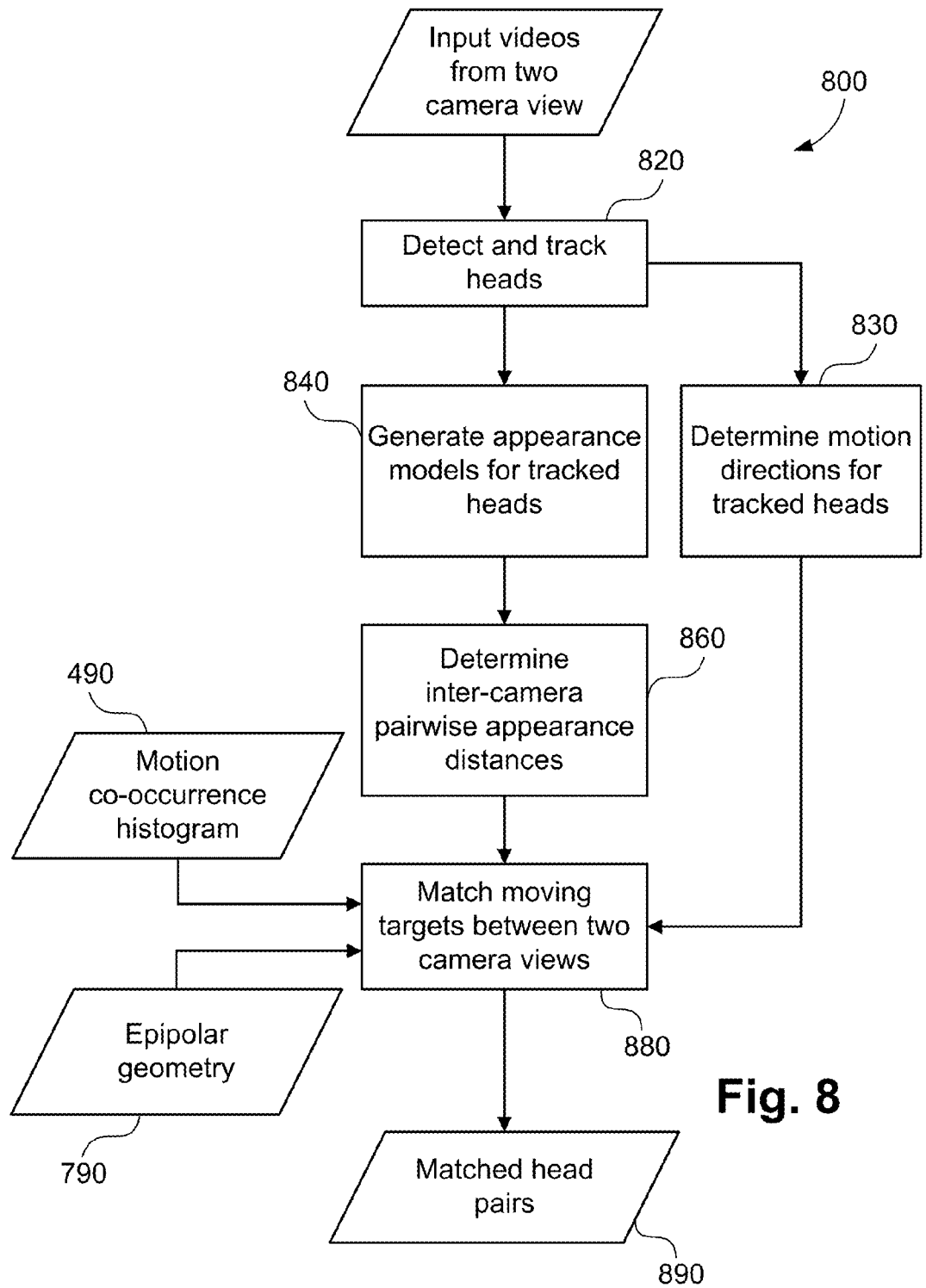
FIG. 8 is a schematic flow diagram showing a method of matching moving targets between two camera views, as executed in the method of FIG. 3.

The method 700 of determining an epipolar geometry model, as executed at step 320, will now be described with reference to FIG. 7. The method 700 may be implemented as one or more code modules of the software application program 233 resident in the storage module 209 of the camera 200 and being controlled in its execution by the processor 205.

The method 700 begins at receiving step 720 where the input videos from the two camera views (e.g., input videos 610 and 615) are received. Human head objects in the input videos are detected and tracked, under execution of the processor 205, as described in relation to step 420 and bounding box locations for the detected head objects along with tracked identifiers (IDs) for each head object are determined. The bounding box locations along with tracked identifiers (IDs) for each detected head object may be stored in the memory 209 under execution of the processor 205. As at step 430, the motion directions are determined for the detected head objects at motion directions determining step 730.

At generating step 740, appearance models are generated for detected head objects in each frame, producing a collection of appearance models for each head object being tracked as at step 440 of the method 400.

Then at distance determining step 760, inter-camera pairwise appearance distances are determined between tracked head objects in the corresponding frames of the two camera views as at step 460 of the method 400.

At modulating step 770, the inter-camera pairwise appearance distances determined at step 760 are modulated by a motion congruence weight to improve the accuracy of the head matching operation in accordance with Equation (4), as follows:

$$D_w(obj_1, obj_2) = D_A(obj_1, obj_2) \times \left(1 + \exp\left(-\frac{C(\varphi 1, \varphi 2)}{\overline{C}}\right)\right) \quad (4)$$

where $\phi_1$ and $\phi_2$ are the motion directions of the head objects determined at step 730; $\overline{C}$ is the average value of the predetermined co-occurrence histogram C 490. A high motion co-occurrence value $C(\phi_1, \phi_2)$ leads to a lower motion congruence weight and vice versa. In other words, a high motion congruency increases the chance that the two tracked objects match. The tracked head pairs that have modulated distances below the predetermined threshold are matched across the two camera views.

The modulated head matching distance in Equation (4) is an example of using both appearance and temporal constraints to improve the accuracy of object re-identification across cameras. To further improve object re-identification accuracy, spatial constraints can also be used. Epipolar geometry is such a spatial constraint for cameras with overlapping fields of view. The epipolar geometry constraint between two camera views may be determined from locations of the matched targets across the camera views.

At epipolar geometry determining step 780, the epipolar geometry between the two camera views is determined using the matched head pairs determined at step 770. Epipolar geometry is a powerful constraint, which, given a head location in the first camera view (e.g., Camera View 1), limits the locus of the matching head in the second camera view (e.g., Camera View 2) along an epipolar line. The epipolar geometry is characterised by a 3×3 fundamental matrix F, which relates the homogeneous coordinates of corresponding points $x_1 = [x_1\ y_1\ 1]^T$ and $x_2 = [x_2\ y_2\ 1]^T$ in two camera views (where the superscript T in $x^T$ denotes the transpose operation which converts a row vector into a column vector and vice versa) in accordance with Equation (5) as follows:

$$x_2^T F x_1 = 0 \quad (5)$$

Fundamental matrix F can be estimated and refined by applying the matched head pairs using any suitable method such as random sample consensus (RANSAC) and the least median of square (LMedS) fundamental matrix estimation method. RANSAC is a robust method that produces an accurate estimate even under the presence of outliers. RANSAC may be used as a first step to prune out grossly incorrect head matches. Once the gross outliers are rejected, the LMedS method may be applied to reduce the influence of noisy or slightly incorrect head matches.

The method 700 concludes by outputting the determined epipolar geometry model 790 between the two camera views of interest. The epipolar geometry model 790 may be stored in the memory 209, under execution of the processor 205.

The method 800 of matching moving targets between two camera views, as executed at step 330, will now be described with reference to FIG. 3. The method 800 may be implemented as one or more code modules of the software application program 233 resident in the storage module 209 of the camera 200 and being controlled in its execution by the processor 205.

The method 800 begins at step 820 where the input videos (e.g., 610 and 615) from the two camera views 810 are received under execution of the processor 205. Then at tracking step 820, human head objects in the input videos are detected and tracked as at step 420 and bounding box locations for the detected head objects along with their tracked identifier (IDs) for each head object are determined. The bounding box locations along with tracked identifiers (IDs) for each detected head object may be stored in the memory 209 under execution of the processor 205.

As described in relation to step 430, the motion directions are determined for the detected head objects at motion directions determining step 830. At generating step 840, appearance models for detected head objects in each frame are determined, producing a collection of appearance models for each head object being tracked as at step 440 of the method 400. Then at distance determining step 860, inter-camera pairwise appearance distances are determined between tracked head objects in the matching frames of the two camera views as performed at step 460.

Matching step 880 utilises the pre-determined motion co-occurrence histogram 490 generated by method 400 and the epipolar geometry 790 determined by method 700 to match the moving target between the two camera views with increased accuracy. At step 880, the inter-camera pairwise appearance distance values are weighted using the motion co-occurrence histogram 490 and the determined epipolar geometry 790 in accordance with Equation (6) as follows:

$$D_w(obj_1, obj_2) = \\ D_A(obj_1, obj_2) \times \left(1 + \exp\left(-\frac{C(\varphi 1, \varphi 2)}{\overline{C}}\right)\right) \times sqrt(1 + E^2(x_1, x_2)) \quad (6)$$

where $\phi_1$ and $\phi_2$ are the motion directions of the head objects determined at step 730; $\overline{C}$ is the average value of the co-occurrence histogram C 490, and $E^2$ is the product of the epipolar reprojection errors between the two head objects' locations $x_1$, $x_2$ determined using the epipolar geometry model 790, where the epipolar reprojection error is the distance between a point and the epipolar line corresponding to another matching point in the other camera view. Equation (6) differs from Equation (4) in the extra epipolar congruency weight. The epipolar congruency weight is greater than or equal to one (1). The epipolar congruency weight is smallest at one (1) when the corresponding epipolar reprojection errors are zero (0). The epipolar congruency weight effectively penalises the matching score between two head objects when their locations do not satisfy the epipolar constraint of the two camera views.

The tracked head pairs that have the weighted distances below the predetermined threshold denote positive matches across the two camera views. The method 800 ends by outputting the matched head pairs 890.

Figure 9:
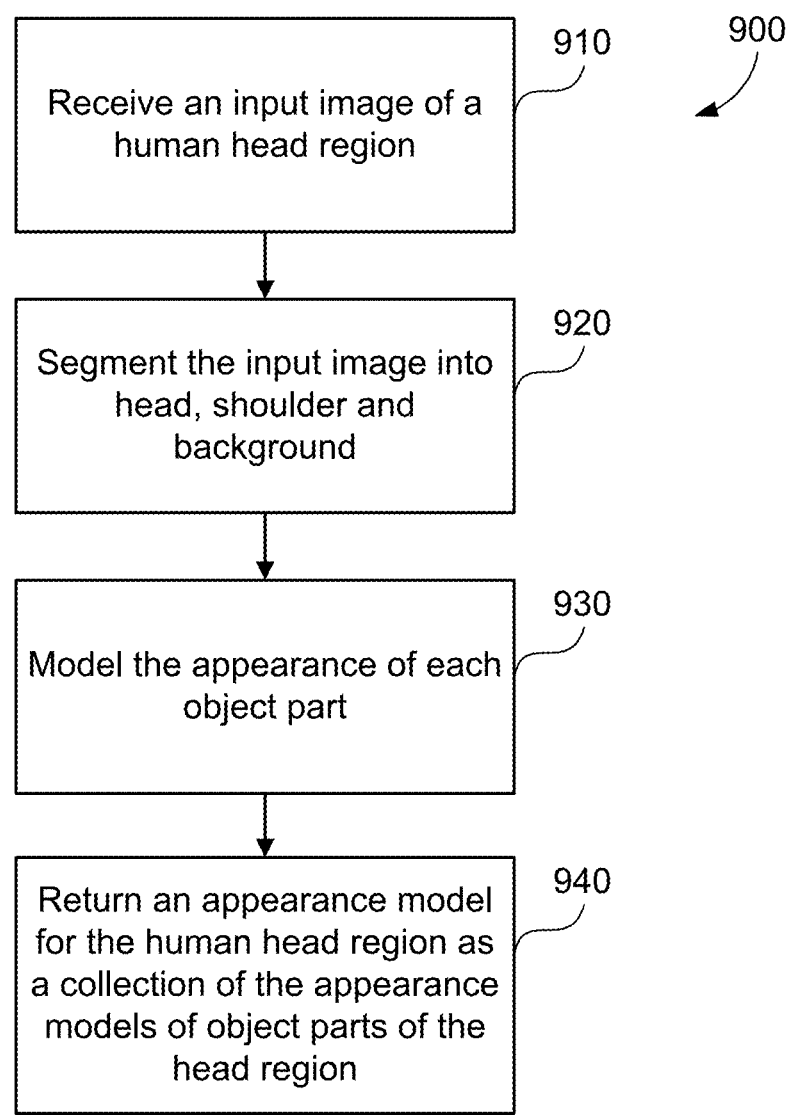
FIG. 9 is a schematic flow diagram showing a method of generating an appearance model of a human head object from an image of the human head object, as executed in the method of FIG. 4.

The method 900 of generating an appearance model of a human head object from an image of the human head object, as executed in step 440, will now be described with reference to FIG. 9. The method 900 may be implemented as one or more code modules of the software application program 233 resident in the storage module 209 of the camera 200 and being controlled in its execution by the processor 205.

The method 900 begins at receiving step 910, where the input image of a tracked head is received under execution of the processor 205. Then at segmenting step 920, the input image is segmented, under execution of the processor 205, into a predefined number of object parts and a background region. For example, if the input image is a headshot such as the headshot 595 shown in FIG. 5B, the input image may be segmented into two object parts (e.g., head 596 and shoulder 597) plus the background region 598. The objects parts and background region determined at step 920 may be stored in the memory 209 under execution of the processor 205.

The method 900 then continues at modelling step 930, where the appearance of each object part is determined. Since the object parts are likely to have different visual appearances, the appearance of each object part is modelled separately. In a case where the input image is a headshot, the appearance of head and shoulder regions are modelled separately. The part-based appearance model may be a colour histogram or a mixture of Gaussian colour models.

The method 900 concludes at returning step 940, where the appearance model of the human head region in the input image is returned as a collection of the appearance models of object parts in the human head region.

The motion direction co-occurrence constraint may be used for matching moving targets across cameras even when appearance-based or location-based constraint fail. Motion direction may be used to distinguish people with similar clothing (e.g., school uniform) if the people walk in different directions. Motion direction may also separate co-located people at the moment of separate co-located people crossing paths.

Group detection and matching may also be used with the motion direction methods described above for distinguishing people walking in a tightly packed group, where the people all share the same motion direction.

The motion co-occurrence histogram can be learnt once during a training phase as in accordance with the method 300 of FIG. 3 described above. In another arrangement, the motion co-occurrence histogram may also be updated regularly. The advantage of regular updates or online learning of the motion co-occurrence histogram is that unseen co-occurred motion direction pairs from less travelled routes may appear with more coverage of the scene over time. As scene content changes (e.g., furniture is moved around, opening of new paths), the motion co-occurrence histogram also updated. Online update of the motion co-occurrence histogram is especially useful for a pan-tilt-zoom (PTZ) cameras, which may change field of view (FOV) during operation. Relative orientation of a new FOV with respect to that of an old FOV can be used to shift the motion co-occurrence histogram accordingly. The old motion co-occurrence histogram may also be subjected to an exponential decay while new co-occurred motion direction entries are accumulated to give gradually phase out outdated motion co-occurrence information.

The difference of motion co-occurrence information from other temporal features for object re-identification is motion co-occurrence is a camera view pair-specific information instead of object-specific information like gait or walking pattern (fast, slow, drunken walk, loitering, . . . ). As a result, once learnt, the motion co-occurrence constraint can be applied to match newly appeared moving objects across the same camera views without having to study the object motion characteristics over an extended amount of time.

While co-occurred motion directions improves the accuracy of object re-identification, motion direction only carries half of the available information from the full motion of an object. The other half of the information, being the motion length, may also be used for re-identification. The motion length is the apparent speed of the moving objects in the corresponding camera view, not the actual speed of the person on the ground. The apparent object speed in each camera view varies over locations and people. The apparent speed is larger for people closer to the camera and smaller for people further away from the camera. The apparent speed also varies from person to person because different people walk at different speeds. However, the ratio of the apparent speeds of a matching target over two camera views depends only on image locations because the person-specific information (i.e., the target's true speed) has been factored out. An apparent speed ratio table may be built over location pairs from two camera views.

The apparent speed ratio table is a 2-dimensional array indexed by image location pairs similar to the location co-occurrence table in the prior art. However, in addition to the frequency count at each entry in the table, which reveal how frequent an object co-appears at the locations, there is a speed ratio value at each entry in the table. Similar to the co-occurred motion direction histogram, the apparent speed ratio table can be determined through accumulation of training video data in an unsupervised manner. Without the need for matching target labels, target pairs with higher appearance similarity get more weight during the accumulation.

A full-sized apparent speed ratio table has a relatively memory cost compared to the method 300 as described above. Given an M-by-N pixel image of each camera view, the table needs M×N-by-M×N entries if locations are sampled at pixel resolution. To reduce the large memory footprint, locations in the input image may be indexed by a coarse array of cells, where each cell contains multiple adjacent pixels. However, the coarse location sampling reduces the resolution of the co-occurrence table, which reduce the accuracy of target matching.

Figure 10A:
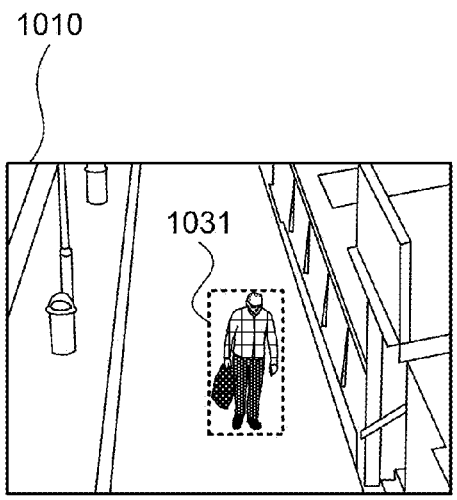
FIG. 10A shows a first camera view.
Figure 10B:
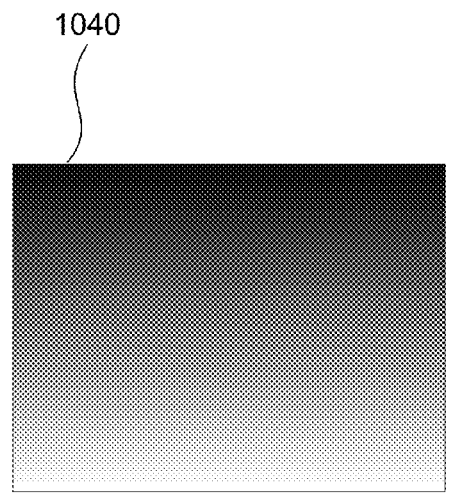
FIG. 10B shows an apparent speed ration image for the first camera view of FIG. 10A.
Figure 10C:
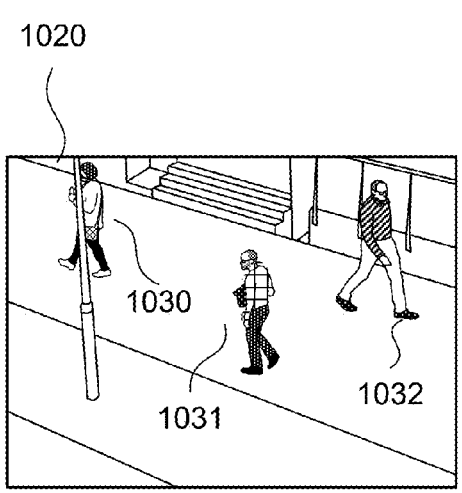
FIG. 10C shows a second camera view.
Figure 10D:
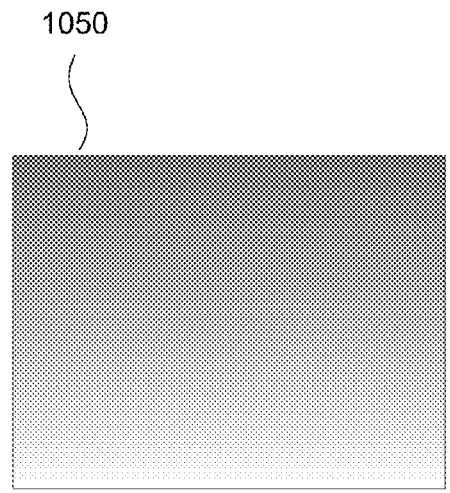
FIG. 10D shows an apparent speed ratio image for the second camera view of FIG. 10C.

One method of reducing the memory footprint of an inter-camera apparent speed ratio table is to dynamically determine the apparent speed ratio (i.e., determined the apparent speed ration on the fly). Dynamically determining the apparent speed ratio requires two pre-determined M-by-N intra-camera apparent speed ratio images and a single inter-camera apparent speed ratio factor. The intra-camera apparent speed ratio image is now described with reference to FIGS. 10A-D. The intra-camera apparent speed ratio at each pixel is the ratio between the apparent speed of a hypothetical moving object at that pixel and the apparent speed of the same moving object at a reference pixel. The intra-camera apparent speed ratio image 1040 in FIG. 10B, for example, is constructed from the camera view 1010 in FIG. 10A. The pixel brightness of image 1040 represents the intra-camera apparent speed ratio at that pixel (i.e., darker means lower ratio and brighter means higher ratio). The reference pixel can be selected at the bottom of the image, where the object is closest to the camera and the apparent speed of the object is therefore highest. As the object moves further away from the camera (i.e. towards the top of the image), the apparent speed of the object reduces. Because the camera view 1010 captures moving objects on a planar ground, the apparent speed reduces linearly from the bottom of the image towards the top of the image. A similar intra-camera apparent speed ratio image 1050 for camera view 1020 of FIG. 10C is shown in FIG. 10D. A linear ramp may also be fitted to the intra-camera apparent speed ratio image 1050 as in image 1040. However, because camera view 1020 does not capture a wide range of depth in the scene camera view 1010, the dynamic range of the linear ramp in image 1050 is smaller than that of image 1040.

The inter-camera apparent speed ratio between a point $p_1$ in camera view 1 and a point $p_2$ in camera view 2 may be determined from the intra-camera apparent speed ratios at these two points in accordance with Equation (7) as follows:

$$\frac{v_1(p_1)}{v_2(p_2)} = \frac{v_1(p_1)/v_1(p_{ref1})}{v_2(p_2)/v_2(p_{ref2})} \times \frac{v_2(p_{ref2})}{v_1(p_{ref1})} \qquad (7)$$

where $v_1(p)$ is the apparent speed of a hypothetical object at a point p in camera view 1, $v_2(q)$ is the apparent speed of the same hypothetical object at a point q in camera view 2, $p_{ref1}$ and $p_{ref2}$ are reference points in camera view 1 and 2 respectively. The inter-camera ratio is derived from the ratio between the intra-camera ratios with a correction factor $v_2(p_{ref2})/v_1(p_{ref1})$. The correction factor $v_2(p_{ref2})/v_1(p_{ref1})$ is an inter-camera apparent speed ratio factor. The correction factor $v_2(p_{ref2})/v_1(p_{ref1})$ is scalar number that relates the apparent speeds of the same object as the object co-appears at the reference points in both camera views. The inter-camera apparent speed ratio factor for any pair of reference points from two camera views may be pre-determined during a training phase. However, to reduce the amount of training data, the reference points for a pair of camera views may be selected as locations of the same object as the object appears in both camera views. The object may be selected from the most reliably matched objects across the two camera views using other constraints such as appearance, epipolar, and/or co-occurred motion direction constraints.

The intra-camera apparent speed ratio image may be obtained from training video with tracked moving objects at roughly constant speed (e.g., cars and pedestrians). Each track provides track speed ratios at a series of locations along the track. The track speed ratios are relative against a reference location along the track. If all tracks intersect with the bottom edge of the image, the bottom locations may be used as the global reference to normalise the track speed ratios. If not all tracks intersect with the bottom edge of the image, the global speed ratio may be found from multiple track speed ratios using bundle adjustment. Given the apparent speed ratios at multiple training locations in the image, an apparent speed ratio at a new location may be interpolated from the training locations. For example, a low-order polynomial may be fit to the training data point using a robust method to reduce the influence of outliers. If the ground is planar and the lens distortion is negligible, a linear planar fit is sufficient to describe the global apparent speed ratio.

When matching cross-camera targets, given the apparent speed of a query target in one camera, the apparent speed of the query target in the other camera may be determined at any pixel location using the inter-camera apparent speed ratio. The determined apparent speed may be compared against the measured apparent speed of a candidate target. If the two compared speeds are close, the query and candidate targets are more likely to match. Other suitable constraints such as appearance, epipolar, and motion direction may be used as well. If the estimated and measured speeds differ, the query and candidate targets are less likely to match. The inter-camera apparent speed ratio may be determined from two intra-camera apparent speed ratios as described above in Equation (7), where the intra-camera apparent speed ratio is determined from training data with moving objects in the scene.

INDUSTRIAL APPLICABILITY

The arrangements described are applicable to the computer and data processing industries and particularly for the image processing.

The foregoing describes only some embodiments of the present invention, and modifications and/or changes can be made thereto without departing from the scope and spirit of the invention, the embodiments being illustrative and not restrictive.

The invention claimed is:

1. A method of matching moving targets between two camera views, the method comprising:
    tracking the moving targets over video frames in each of the camera views and recording motion directions of the targets;
    determining appearance similarities for cross-camera target pairs over synchronised ones of the video frames;
    determining a joint probability model of co-occurred ones of the recorded motion directions for the camera views using a weighted accumulation of the recorded motion directions of the cross-camera target pairs, where accumulation weights used in determining the joint probability model are derived from the determined appearance similarities; and
    matching the moving targets between the camera views using the joint probability model.

2. The method according to claim 1, wherein an epipolar geometry constraint between the camera views is determined from locations of matched targets across the camera views.

3. The method according to claim 2, wherein the targets are matched using the determined epipolar geometry constraint.

4. The method according to claim 1, wherein the joint probability model is a two-dimensional motion co-occurrence histogram.

5. The method according to claim 1, wherein the joint probability model is a mixture of Gaussian models.

6. The method according to claim 1, wherein the appearance similarities are determined from a set of part-based appearance distances between corresponding object parts.

7. The method according to claim 1, wherein the moving targets are headshots of people with two object parts representing a head and shoulder.

8. The method according to claim 1, wherein the moving targets are full human bodies, each comprising of three parts representing a head, torso and legs.

9. The method according to claim 1, wherein at least one of:
    (i) in response to the tracked moving targets changing respective appearances multiple times during tracking, multiple representative appearance models are determined; and
    (ii) at least one of the representative appearance models is selected from the multiple representative appearance models, and intra-camera appearance distances from the selected representative appearance model to each representative appearance model of the multiple representative appearance models are determined.

10. The method of claim 9, wherein inter-camera appearance distances are determined in a pairwise fashion between the tracked moving targets across two camera views.

11. The method of claim 10, further comprising combining, for each frame of the video frames, the determined intra-camera appearance distances to the representative appearance models and the determined inter-camera pairwise appearance distances to produce or determine an inter-camera pairwise similarity weight.

12. The method of claim 11, further comprising, via comparison with the selected representative appearance model, increasing the inter-camera pairwise similarity weight for each frame of the video frames that is similar to a representative frame corresponding to the selected representative appearance model and reducing the inter-camera pairwise similarity weight for each frame of the video frames that dissimilar to the representative frame.

13. The method of claim 11, further comprising determining a motion co-occurrence histogram by accumulating the inter-camera pairwise similarity weights,
wherein the motion co-occurrence histogram forms the joint probability model of co-occurred motion directions between the two camera views.

14. A system for matching moving targets between two camera views, the system comprising:
a memory for storing data and a computer program;
at least one processor coupled to the memory for executing the computer program, the at least one processor operating to:
track the moving targets over video frames in each of the camera views and record motion directions of the targets;
determine appearance similarities for cross-camera target pairs over synchronised ones of the video frames;
determine a joint probability model of co-occurred ones of the recorded motion directions for the camera views using a weighted accumulation of the recorded motion directions of the cross-camera target pairs, where accumulation weights used in determining the joint probability model are derived from the determined appearance similarities; and
match the moving targets between the camera views using the joint probability model.

15. An apparatus for matching moving targets between two camera views, the apparatus comprising:
means for tracking the moving targets over video frames in each of the camera views and recording motion directions of the targets;
means for determining appearance similarities for cross-camera target pairs over synchronised ones of the video frames;
means for determining a joint probability model of co-occurred ones of the recorded motion directions for the camera views using a weighted accumulation of the recorded motion directions of the cross-camera target pairs, where accumulation weights used in determining the joint probability model are derived from the determined appearance similarities; and
means for matching the moving targets between the camera views using the joint probability model.

16. A non-transitory computer readable medium having at least one computer program stored on the medium for causing a processor to execute a method of matching moving targets between two camera views, the method comprising:
tracking the moving targets over video frames in each of the camera views and recording motion directions of the targets;
determining appearance similarities for cross-camera target pairs over synchronised ones of the video frames;
determining a joint probability model of co-occurred ones of the recorded motion directions for the camera views using a weighted accumulation of the recorded motion directions of the cross-camera target pairs, where accumulation weights used in determining the joint probability model are derived from the determined appearance similarities; and
matching the moving targets between the camera views using the joint probability model.

* * * * *